United States Patent
Wilson et al.

(10) Patent No.: US 10,036,462 B2
(45) Date of Patent: Jul. 31, 2018

(54) VEHICLE DIFFERENTIAL

(71) Applicant: GM GLOBAL TECHNOLOGY OPERATIONS LLC, Detroit, MI (US)

(72) Inventors: William J. Wilson, Commerce, MI (US); Steven G. Trombat, Troy, MI (US); Jevon Kennell, Howell, MI (US); Debkumar Rakshit, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/364,917

(22) Filed: Nov. 30, 2016

(65) Prior Publication Data

US 2018/0149253 A1  May 31, 2018

(51) Int. Cl.
*F16H 48/40* (2012.01)
*F16H 48/08* (2006.01)
*F16H 48/38* (2012.01)

(52) U.S. Cl.
CPC ............. *F16H 48/40* (2013.01); *F16H 48/08* (2013.01); *F16H 2048/385* (2013.01)

(58) Field of Classification Search
CPC ..... F16H 48/08; F16H 48/40; F16H 2048/385
See application file for complete search history.

(56) References Cited

U.S. PATENT DOCUMENTS

2013/0074649 A1\*  3/2013  Taniguchi ............... F16H 48/40
                                                              74/606 R \* cited by examiner

*Primary Examiner* — Huan Le
(74) *Attorney, Agent, or Firm* — Cantor Colburn LLP

(57) ABSTRACT

A differential barrel includes a body having a first end, a second end, and an intermediate portion extending therebetween. A ring gear support member extends outwardly at the second end. A ring gear support surface forms a first section of the intermediate portion. The ring gear support surface defines a first outer diameter of the intermediate portion. A ring gear alignment surface forms a second section of the intermediate portion. The ring gear alignment surface defines a second outer diameter of the intermediate portion. A ring gear is mounted to the outer surface of the body and includes an inner annular surface including a first region defining a first inner diameter and a second region defining a second inner diameter. The first region establishes an interference fit with the ring gear support surface. The second inner diameter is no more than about 0.05-inches (1.27-mm) greater than the second outer diameter.

20 Claims, 4 Drawing Sheets

VEHICLE DIFFERENTIAL

FIELD OF THE INVENTION

The subject invention relates to the art of vehicles and, more particularly, to a vehicle differential.

BACKGROUND

Vehicles may include a differential that converts a rotational input from a transmission or gear box to a rotational output driving one or more wheels. Typically, the differential includes a differential barrel having an outer surface that supports a ring gear. The differential barrel also supports a planetary gear set that is operatively coupled to the one or more wheels. A pinion gear engages with the ring gear. The pinion gear may be driven by a drive shaft. The ring gear is bonded to the outer surface of the differential housing. In some cases, the bond may take the form of one or more mechanical fasteners. In other cases, the bond may take the form of a weld. In still other cases, the bond may take the form of an interference fit.

Occasionally, a ring gear mounted and bonded through a weld or an interference fit may suffer from a misalignment during assembly. A misalignment of the ring gear relative to the differential barrel may lead to undesirable wear on the pinion gear and/or create unwanted noise. Accordingly, it is desirable to provide a mechanism that promotes proper alignment of the ring gear and the differential housing.

SUMMARY OF THE INVENTION

In accordance with an aspect of an exemplary embodiment, a differential barrel includes a body having an outer surface. The body has a first end, a second end, and an intermediate portion extending therebetween. A ring gear support member extends outwardly of the body at the second end. A ring gear support surface forms a first section of the intermediate portion. The ring gear support surface defines a first outer diameter of the intermediate portion. A ring gear alignment surface forms a second section of the intermediate portion. The ring gear alignment surface defines a second outer diameter of the intermediate portion. A ring gear is mounted to the outer surface of the body. The ring gear includes an inner annular surface including a first region defining a first inner diameter and a second region defining a second inner diameter. The first region establishes an interference fit with the ring gear support surface. The second inner diameter is no more than about 0.05-inches (1.27-mm) greater than the second outer diameter.

In accordance with another aspect of an exemplary embodiment, a differential includes a housing portion having an outer surface and an inner surface defining a gear receiving zone. A first axle tube extends outwardly of the housing portion in a first direction. A second axle tube extends outwardly of the housing portion in a second direction opposite of the first direction. A differential barrel is arranged in the housing portion. The differential barrel includes a body having an outer surface. The body has a first end, a second end, and an intermediate portion extending therebetween. A ring gear support member extends outwardly of the body at the second end. A ring gear support surface forms a first section of the intermediate portion. The ring gear support surface defines a first outer diameter of the intermediate portion. A ring gear alignment surface forms a second section of the intermediate portion. The ring gear alignment surface defines a second outer diameter of the intermediate portion. A ring gear is mounted to the outer surface of the body. The ring gear includes an inner annular surface including a first region defining a first inner diameter and a second region defining a second inner diameter. The first region establishes an interference fit with the ring gear support surface. The second inner diameter is no more than about 0.05-inches (1.27-mm) greater than the second outer diameter.

In accordance with yet another aspect of an exemplary embodiment, a vehicle includes a chassis, a body supported by the chassis, and a drivetrain supported by the chassis. The drivetrain includes a differential. The differential includes a housing portion having an outer surface and an inner surface defining a gear receiving zone. A first axle tube extends outwardly of the housing portion in a first direction. A second axle tube extends outwardly of the housing portion in a second direction opposite of the first direction. A differential barrel is arranged in the housing portion. The differential barrel includes a body having an outer surface. The body has a first end, a second end, and an intermediate portion extending therebetween. A ring gear support member extends outwardly of the body at the second end. A ring gear support surface forms a first section of the intermediate portion. The ring gear support surface defines a first outer diameter of the intermediate portion. A ring gear alignment surface forms a second section of the intermediate portion. The ring gear alignment surface defines a second outer diameter of the intermediate portion. A ring gear is mounted to the outer surface of the body. The ring gear includes an inner annular surface including a first region defining a first inner diameter and a second region defining a second inner diameter. The first region establishes an interference fit with the ring gear support surface. The second inner diameter is no more than about 0.05-inches (1.27-mm) greater than the second outer diameter.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
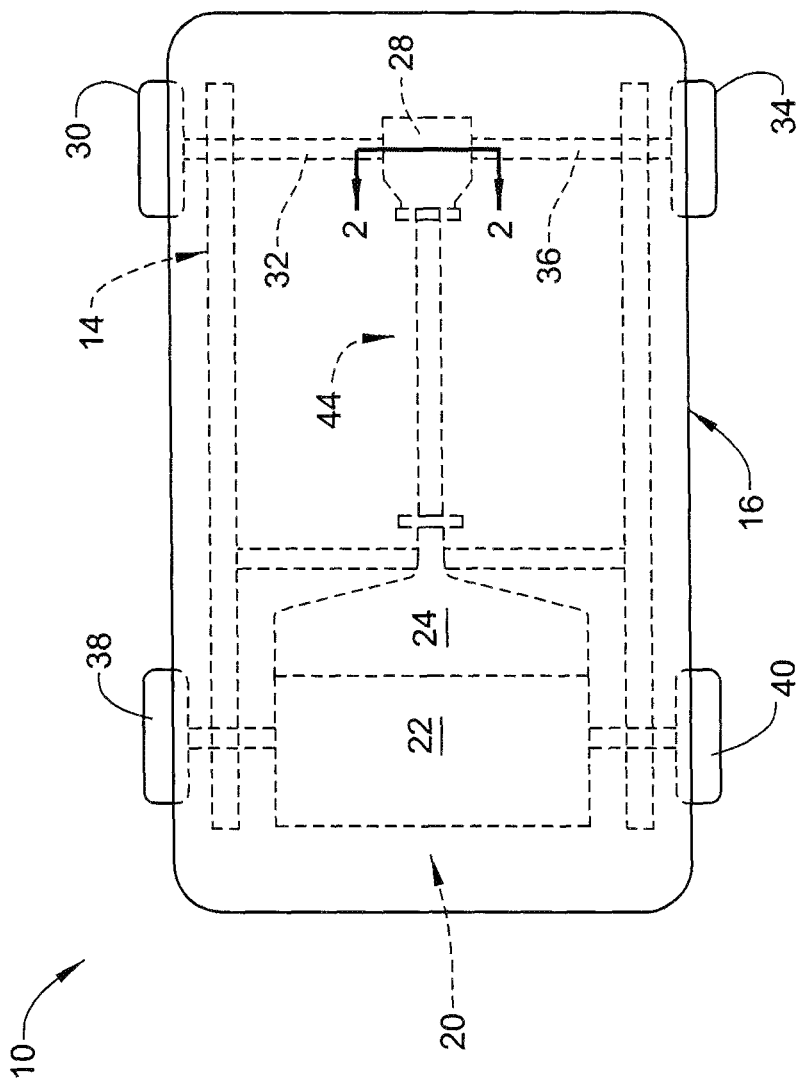
FIG. 1 depicts a vehicle including a differential, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 14 supporting a body 16. Chassis 14 also supports a drivetrain 20 including a motor 22, a transmission 24 and a rear differential 28. It is to be understood that motor 22 may take the form of an electric motor, an internal combustion engine, a hybrid electric motor or other forms of prime movers that provide motive power to vehicle 10. Rear differential 28 is coupled to a first rear wheel 30 through a first axle 32 and to a second rear wheel 34 through a second axle 36. Vehicle 10 may also include first and second front wheels 38 and 40. It is also to be understood that while shown as having a rear wheel drive, other drive configurations including front wheel drive and four wheel drive may also be employed. Rear differential 28 is coupled to transmission 24 through a driveshaft 44.

Figure 2:
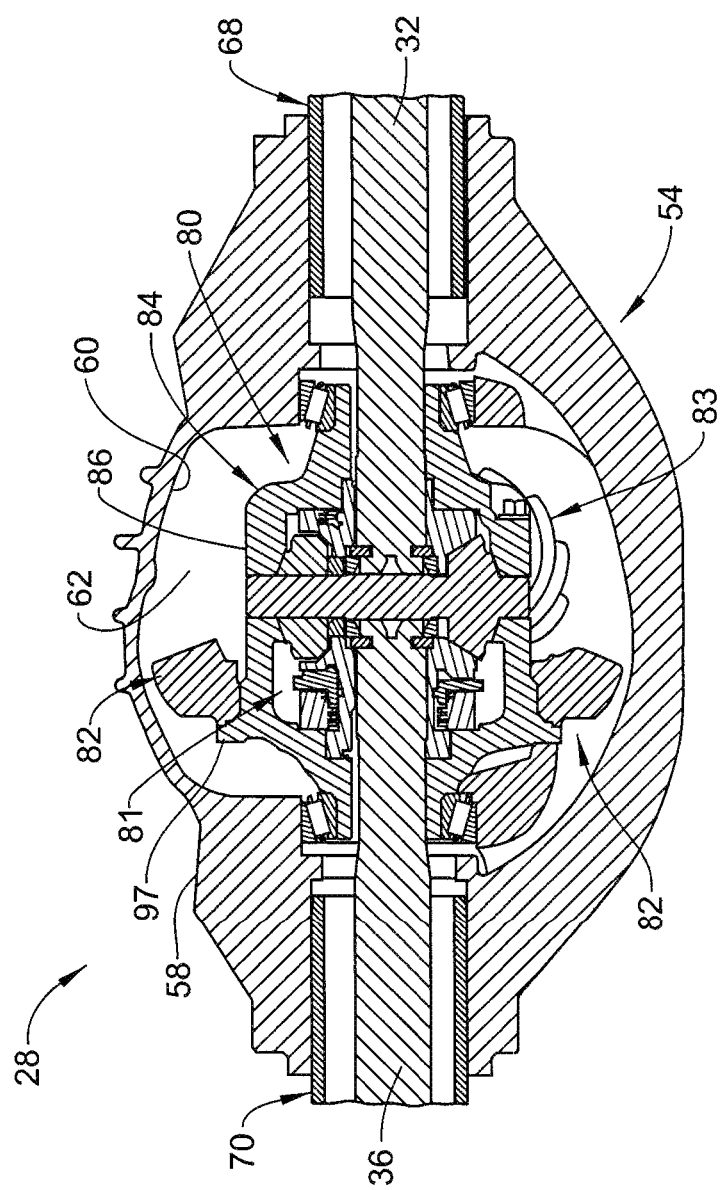
FIG. 2 depicts a partially cut-away view of the differential of FIG. 1.

In accordance with an aspect of an exemplary embodiment shown in FIG. 2, rear differential 28 includes a housing portion 54 having an outer surface 58 and an inner surface 60 that defines a gear receiving zone 62. Housing portion 54 also supports a first axle tube 68 that surrounds first axle 32 and a second axle tube 70 that surrounds second axle 36. Gear receiving zone 62 houses a differential barrel 80 that supports a planetary gear set 81 and a ring gear 82. Ring gear 82 engages with a pinion 83 driven by driveshaft 44. Pinion 83 engages with ring gear 82 to rotate differential barrel 80 which in turn drives first and second axles 32 and 36 through the planetary gear set 81.

Figure 3:
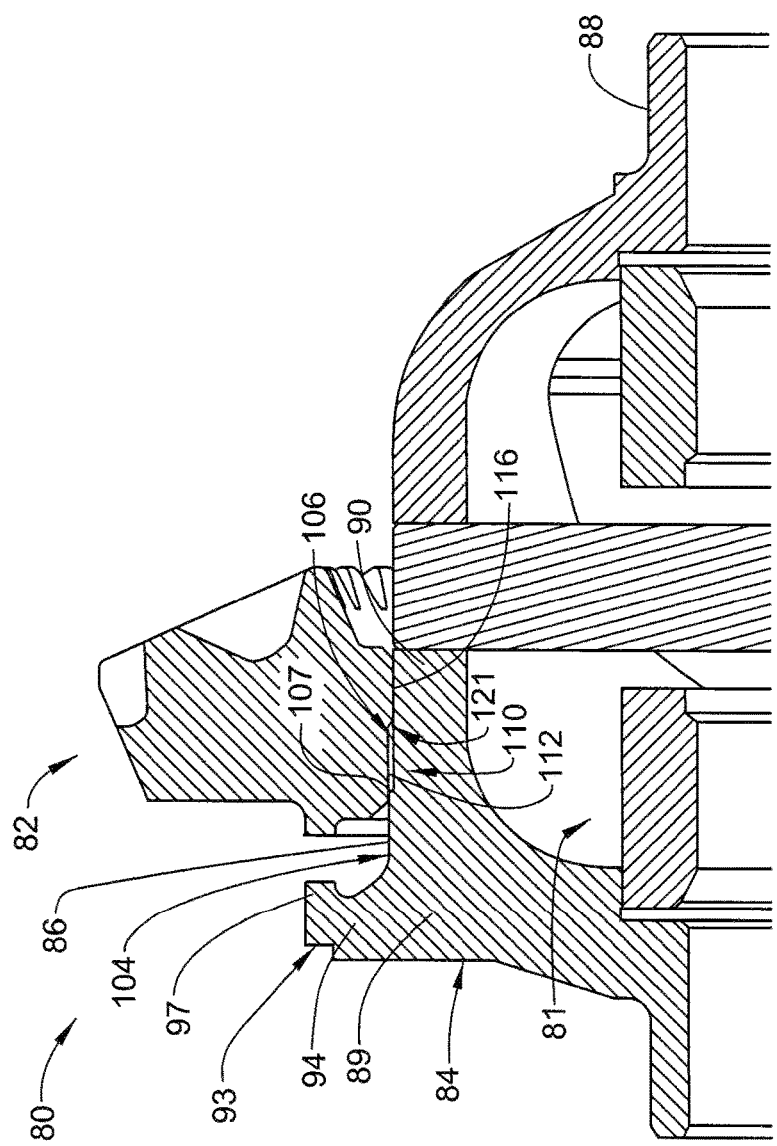
FIG. 3 depicts a cross-sectional view of the a differential barrel of the differential of FIG. 2 illustrating a disassembled ring gear.
Figure 4:
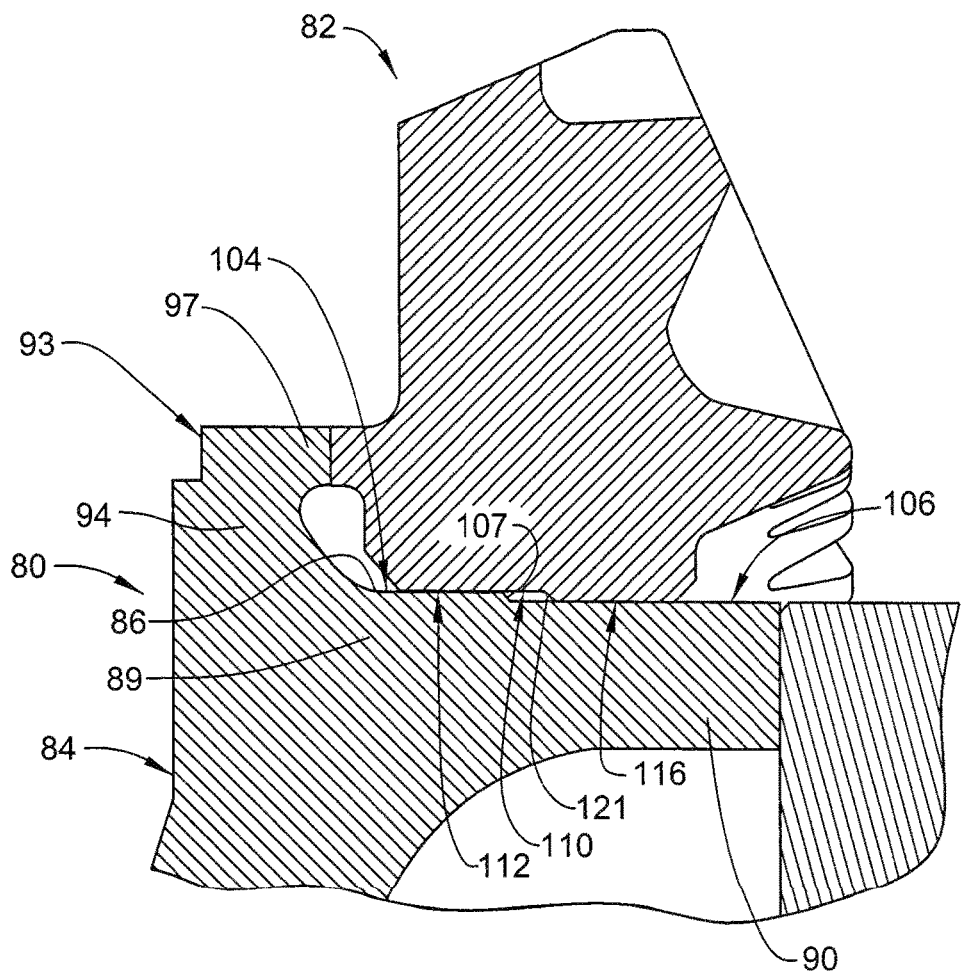
FIG. 4 depicts a cross-sectional view of the differential of FIG. 2 illustrating the ring gear assembled to the differential housing.

Reference will now follow to FIGS. 3 and 4 in describing differential barrel 80 and ring gear 82. Differential barrel 80 includes a body 84 having an outer surface 86 including a first end 88, a second end 89, and an intermediate portion 90. Second end 89 includes a ring gear support member 93 that provides a desired position of ring gear 82 on body 84. Ring gear support member 93 includes a radially outwardly projecting portion 94 that extends from body 84 at second end 89 and an axially projecting portion 97. Ring gear 82 may be positioned on body 84 abutting axial projecting portion 97 to establish a desired position on outer surface 86. (FIG. 2)

In further accordance with an exemplary embodiment, differential barrel 80 also includes a ring gear support surface 104 and a ring gear alignment surface 106 formed on body 84. Ring gear support surface 104 establishes a first outer diameter of intermediate portion 90 that is adjacent ring gear support member 93. Ring gear alignment surface 106 establishes a second outer diameter of intermediate portion 90 that is between ring gear support surface 104 and first end 88. A step portion 107 is defined between the first outer diameter and the second outer diameter. Step portion 107 includes an angled edge portion (not separately labeled) that guides ring gear 82 from ring gear alignment surface 106 onto ring gear support surface 104. As will be detailed below, the second outer diameter of ring gear alignment surface 106 is sized so as to define an anti-cocking feature for ring gear 82.

In accordance with an aspect of an exemplary embodiment, ring gear 82 includes an inner annular surface 110 having a first region 112 that defines a first inner diameter and a second region 116 that defines a second inner diameter that is less than the first inner diameter. A step region 121 is defined between first region 112 and second region 116.

In accordance with an aspect of an exemplary embodiment, first inner diameter 112 establishes an interference or press fit with the ring gear support surface 104. In further accordance with an exemplary aspect, ring gear 82 is designed with a sliding fit or location clearance fit relative to ring gear alignment surface. Specifically, ring gear 82 is configured to shift over ring gear alignment surface 106 without canting, cocking, or otherwise becoming misaligned. In order to facilitate the sliding fit and substantially prevent misalignments, in one example, second inner diameter is no more than about 0.05-inches (1.27-mm) greater than the second outer diameter. In accordance with another aspect of an exemplary embodiment, the second inner diameter is no more than about 0.024-inches (0.610-mm).

In accordance with another aspect of an exemplary embodiment, second region 116 projects radially proudly relative to first region 112 by no more than about 0.5-inches (1.27-cm). In accordance with another aspect of an exemplary embodiment, second region 116 projects radially proudly relative to first region 112 by no more than about 0.25-inches (0.635-cm). In accordance with yet another aspect of an exemplary embodiment, second region 116 projects radially inwardly relative to first region 112 by no more than about 0.125-inches (0.32-cm). In accordance with yet still another aspect of an exemplary embodiment, second region 116 projects radially proudly relative to first region 112 by no more than about 0.0625-inch (0.159-cm). Step region 121 cooperates with step portion 107 to promote movement of ring gear 82 over body 84 such that first region 112 may be press-fit to ring gear support surface 104 while maintaining a desired alignment relative to outer surface 86.

The term "about" is intended to include the degree of error associated with measurement of the particular quantity based upon the equipment available at the time of filing the application. For example, "about" can include a range of ±8% or 5%, or 2% of a given value.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A differential barrel comprising:
    a body including an outer surface, the body having a first end, a second end, and an intermediate portion extending therebetween;
    a ring gear support member extending outwardly of the body at the second end;
    a ring gear support surface forming a first section of the intermediate portion, the ring gear support surface defining a first outer diameter of the intermediate portion;
    a ring gear alignment surface forming a second section of the intermediate portion, the ring gear alignment surface defining a second outer diameter of the intermediate portion;
    a step region is disposed between the ring gear support surface and the ring gear alignment surface, the step region includes an angled surface inclined from the ring gear alignment surface towards the ring gear support surface, the angled surface having an angle that is less than about 90° relative to a longitudinal axis of the body; and
    a ring gear mounted to the outer surface of the body, the ring gear including an inner annular surface including a first region defining a first inner diameter a second region defining a second inner diameter, the first region establishing an interference fit with the ring gear support surface, wherein the second inner diameter is no more than about 0.05-inches (1.27-mm) greater than the second outer diameter.

2. The differential barrel according to claim 1, wherein the second inner diameter is no more than about 0.04-inches (1.016-mm).

3. The differential barrel according to claim 1, wherein the second region projects radially inwardly relative to the first region by no more than about 0.5-inches (1.27-cm).

4. The differential barrel according to claim 1, wherein the second region projects radially inwardly relative to the first region by no more than about 0.25-inches (0.635-cm).

5. The differential barrel according to claim 1, wherein the second region projects radially inwardly relative to the first region by no more than about 0.125-inches (0.32-cm).

6. The differential barrel according to claim 1, wherein the second region projects radially inwardly relative to the first region by no more than about 0.0625-inches (0.159-cm).

7. The differential barrel according to claim 1, wherein the second region directly abuts the ring gear alignment surface.

8. A differential comprising:
a housing portion including an outer surface and an inner surface defining a gear receiving zone;
a first axle tube extending outwardly of the housing portion in a first direction;
a second axle tube extending outwardly of the housing portion in a second direction opposite of the first direction; and
a differential barrel arranged in the housing portion, the differential barrel comprising:
a body including an outer surface, the body having a first end, a second end, and an intermediate portion extending therebetween;
a ring gear support member extending outwardly of the body at the second end;
a ring gear support surface forming a first section of the intermediate portion, the ring gear support surface defining a first outer diameter of the intermediate portion;
a ring gear alignment surface forming a second section of the intermediate portion, the ring gear alignment surface defining a second outer diameter of the intermediate portion;
a step region is disposed between the ring gear support surface and the ring gear alignment surface, the step region includes an angled surface inclined from the ring gear alignment surface towards the ring gear support surface, the angled surface having an angle that is less than about 90° relative to a longitudinal axis of the body; and
a ring gear mounted to the outer surface of the body, the ring gear including an inner annular surface including a first region defining a first inner diameter a second region defining a second inner diameter, the first region establishing an interference fit with the ring gear support surface, wherein the second inner diameter is no more than about 0.05-inches (1.27-mm) greater than the second outer diameter.

9. The differential according to claim 8, wherein the second inner diameter is no more than about 0.04-inches (1.016-mm).

10. The differential according to claim 8, wherein the second region projects radially inwardly relative to the first region by no more than about 0.5-inches (1.27-cm).

11. The differential according to claim 8, wherein the second region projects radially inwardly relative to the first region by no more than about 0.25-inches (0.635-cm).

12. The differential according to claim 8, wherein the second region projects radially inwardly relative to the first region by no more than about 0.125-inches (0.32-cm).

13. The differential according to claim 8, wherein the second region projects radially inwardly relative to the first region by no more than about 0.0625-inches (0.159-cm).

14. The A differential according to claim 8, wherein the second region directly abuts the ring gear alignment surface.

15. A vehicle comprising:
a chassis;
a body supported by the chassis;
a drivetrain supported by the chassis, the drivetrain including a differential, the differential comprising:
a housing portion including an outer surface and an inner surface defining a gear receiving zone;
a first axle tube extending outwardly of the housing portion in a first direction;
a second axle tube extending outwardly of the housing portion in a second direction opposite of the first direction; and
a differential barrel arranged in the housing portion, the differential barrel comprising:
a body including an outer surface, the body having a first end, a second end, and an intermediate portion extending therebetween;
a ring gear support member extending outwardly of the body at the second end;
a ring gear support surface forming a first section of the intermediate portion, the ring gear support surface defining a first outer diameter of the intermediate portion;
a ring gear alignment surface forming a second section of the intermediate portion, the ring gear alignment surface defining a second outer diameter of the intermediate portion;
a step region is disposed between the ring gear support surface and the ring gear alignment surface, the step region includes an angled surface inclined from the ring gear alignment surface towards the ring gear support surface, the angled surface having an angle that is less than about 90° relative to a longitudinal axis of the body; and
a ring gear mounted to the outer surface of the body, the ring gear including an inner annular surface including a first region defining a first inner diameter a second region defining a second inner diameter, the first region establishing an interference fit with the ring gear support surface, wherein the second inner diameter is no more than about 0.05-inches (1.27-mm) greater than the second outer diameter.

16. The vehicle according to claim 15, wherein the second inner diameter is no more than about 0.04-inches (1.016-mm).

17. The vehicle according to claim 15, wherein the second region projects radially inwardly relative to the first region by no more than about 0.5-inches (1.27-cm).

18. The vehicle according to claim 15, wherein the second region projects radially inwardly relative to the first region by no more than about 0.25-inches (0.635-cm).

19. The vehicle according to claim 15, wherein the second region projects radially inwardly relative to the first region by no more than about 0.125-inches (0.32-cm).

20. The vehicle according to claim 15, wherein the second region projects radially inwardly relative to the first region by no more than about 0.0625-inches (0.159-cm).

* * * * *